(12) United States Patent
Le Nabour et al.

(10) Patent No.: US 6,841,892 B1
(45) Date of Patent: Jan. 11, 2005

(54) WIND MACHINE WITH SLANTED BLADES

(75) Inventors: Marcel Le Nabour, Maisons Lafitte (FR); Christophe Hagopian, Créteil (FR)

(73) Assignee: Compagnie Internationale de Turbines Atmospheriques, Alfortville (FR)

( * ) Notice: Subject to any disclaimer, the term of this patent is extended or adjusted under 35 U.S.C. 154(b) by 0 days.

(21) Appl. No.: 09/868,971

(22) PCT Filed: Nov. 5, 1999

(86) PCT No.: PCT/FR99/02705
§ 371 (c)(1),
(2), (4) Date: Jan. 2, 2002

(87) PCT Pub. No.: WO00/70219
PCT Pub. Date: Nov. 23, 2000

(30) Foreign Application Priority Data

May 12, 1999 (FR) .............................. 99 06076

(51) Int. Cl.⁷ .............................................. F03D 11/00
(52) U.S. Cl. ....................... 290/43; 290/54; 416/245 R
(58) Field of Search .............................. 290/43, 44, 54, 290/55; 416/245 R

(56) References Cited

U.S. PATENT DOCUMENTS

| | | | |
|---|---|---|---|
| 3,209,156 A | 9/1965 | Struble | |
| 4,021,135 A | 5/1977 | Pedersen et al. | |
| 4,140,433 A | 2/1979 | Eckel | |
| 4,291,235 A | * 9/1981 | Bergey et al. | 290/55 |
| 4,720,640 A | * 1/1988 | Anderson et al. | 290/43 |
| 4,781,523 A | 11/1988 | Aylor | |
| 5,149,251 A | * 9/1992 | Scanlon et al. | 416/245 R |
| 6,452,287 B1 | * 9/2002 | Looker | 290/55 |

FOREIGN PATENT DOCUMENTS

| | | | | |
|---|---|---|---|---|
| DE | 804 090 C | 4/1951 | | |
| DE | 757 548 C | 8/1953 | | |
| DE | 4437972 A1 | * 4/1996 | | H02K/7/18 |
| DE | 19802574 A1 | * 3/1999 | | F03D/11/00 |
| EP | 1243790 A1 | * 9/2002 | | F03D/7/02 |
| GB | 2230565 A | * 10/1990 | | F03D/1/04 |
| JP | 2003120509 A | * 4/2003 | | F03D/11/00 |

* cited by examiner

Primary Examiner—Joseph Waks
(74) Attorney, Agent, or Firm—Baker & Daniels

(57) ABSTRACT

A wind machine mounted on a vertical mast (2) and having a wind-driven turbine (1) co-operating with an alternator to generate electrical power, this turbine (1) being fitted with slanting blades (6) mounted on a large-diameter hub (7) with a horizontal axis, the generators of which are located along the trunk of a cone facing the wind, characterized in that the alternator comprises, on the one hand, a magnetic rotor (4) secured to the hub (7), preferably on a level with the maximum available diameter, and on the other hand a stator (5), adjacent to the rotor (4), with magnetic coils distributed in a partial or full circle, and secured to a stationary frame (22) joined to an encircling hood (9) extending the hub (7) coaxially, the blades (6) being shrouded in the vicinity of their ends (55) by a relatively short, divergent, circular fairing (8) mounted concentrically with the hub (7).

9 Claims, 5 Drawing Sheets

WIND MACHINE WITH SLANTED BLADES

Figure 1:
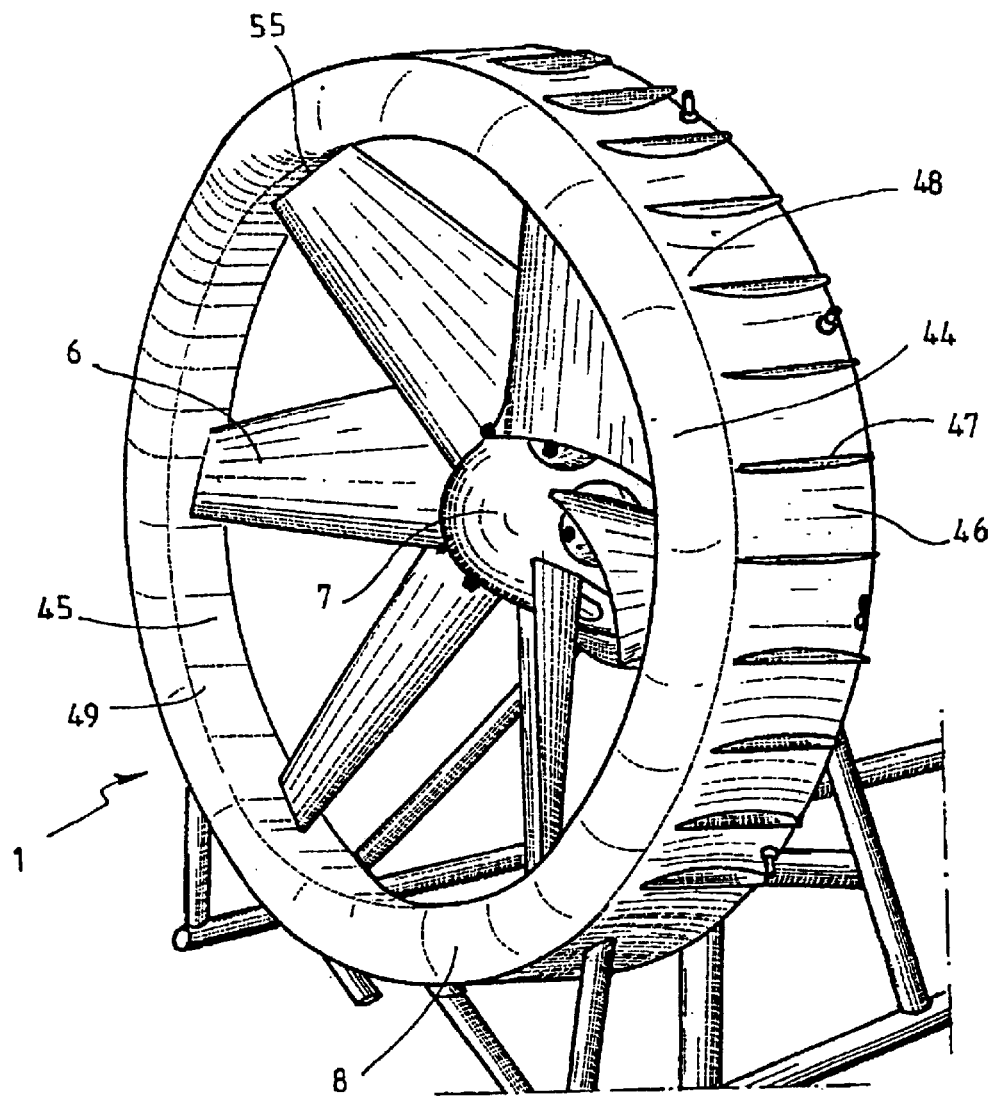

The present invention relates to a wind machine mounted on a vertical mast having a wind-driven turbine co-operating with an alternator in order to generate electric power.

For a long time, specialists have been seeking to capture wind energy, which has the advantage of being clean, i.e. it does not cause thermal or chemical pollution, and at the same time renewable.

However, these advantages are to a large extent offset by a series of disadvantages, in particular related to the disperse and intermittent nature of wind; moreover, it is known that wind "farms" require a lot of space and can not operate without generating a noise nuisance.

As a result of these disadvantages, the market for wind machines has not taken off as one might have expected over the last few years and the potential for development in this field still remains enormous.

More specifically, the wind machines which are currently used are usually fitted with turbines having radial blades on a horizontal shaft similar to those used to propel aircraft, but generally speaking much larger. Such turbines conventionally co-operate with industrial dynamos or alternators having variable speed drives, which make them heavy, expensive and low in output.

The use of turbines with a vertical shaft and vertical blades, known as "panemones" has been proposed because they have the advantage of being less expensive and do not depend on specific members being positioned facing the wind but their output is mediocre.

In both of these systems, the blades are fragile and are subjected to vibrations and resonance, which causes breakage due either to fatigue or to gusts of wind; being inadequately protected, these members can therefore be very dangerous.

A third type of wind machine has been described in theory in various publications but not used on an industrial scale and has slanting blades extending from a large hub, the generators of which are located along the trunk of a cone facing the wind. The latter drives the blades in rotation and is guided by a diffuser unit comprising the hub, the blades and, in some cases, a concentrically mounted fairing surrounding the ends of the latter.

In a system of this type, the air flow is divergent, which enables extra speed to be generated in line with the blades and increases the amount of energy transmitted; in addition, the slanting blades are longer than radial blades of the same effective diameter and are active across their entire length without any terminal aerodynamic loss, which increases output still further.

Wind machines of this type are described in publications U.S. Pat. No. 4,781,523, DE-804 090 or FR-2 627 812, for example.

Mention should also be made of another wind machine, known from document FR-2 763 759, with an electric generator, the rotor of which is linked to a fairing which joins the ends of the blades to one another, hence at the point of their maximum diameter; a wind machine of this same type had previously been described in document U.S. Pat. No. 1,352,960: this wind machine has a peripheral rim bearing inductor magnets and constituting a rotor positioned facing a group of three laminated magnetic poles on which electric conductors supplied with current are wound in order to provide a stator outside the rotor.

Document FR-967 895 proposes large-diameter electrical machines with vertical shafts, in which the inductor rotor and the induced stator are disposed along flat rings, either of the same dimension one on top of the other or one inside the other; in either case, the rotor is mounted and guided by means of a circular roller track matching a horizontal rail fixed to the ground or on a pylon and on which rollers linked to the rotor run.

The electric generators disclosed by these 15 publications are very cumbersome and heavy and therefore require expensive mounting structures and pylons.

The objective of the present invention is to overcome these disadvantages by proposing a more robust wind machine, which is less cumbersome but of the same power and less noisy than the wind machines proposed to date.

This wind machine has a wind-driven turbine fitted with blades borne on a large-diameter hub on a horizontal shaft.

In accordance with the invention, a wind machine of this type is characterised in that it is fitted with an alternator comprising, firstly, a magnetic rotor secured to the hub, preferably on a level with the maximum available diameter, and, secondly, a stator with magnetic coils, adjacent to the rotor, disposed in a partial or full circle, and secured to a fixed frame joined to an encircling hood mounted coaxially with and extending the hub to form a streamlined casing in which the alternator is housed.

The rotor is preferably provided with permanent magnets, regularly distributed in a circle.

Accordingly, in a particularly advantageous manner, the gears and speed drives linked to the generators in commercial use to date can be dispensed with, offering a high-power wind machine that is directly driven.

By virtue of a preferred feature of the invention, the internal part of the hub is provided with a flat ring having a horizontal axis, coinciding with the axis of rotation, the lateral faces and/or internal or external peripheral edge of which co-operate with groups of runner wheels with fixed shafts joined to the frame so as to define a retaining and guide rail during rotation.

As a general rule, the groups of runner wheels are runners made from metal or coated with hard plastics, of the type used on conveyors or warehouse trolleys. Between them, these wheels retain the flat ring at various points around its periphery; their distribution will, of course, depend on how much force is required and more will therefore be provided at the top and bottom as needed.

However, it should be pointed out that significantly fewer groups of wheels are needed than is the case with the prior art designs described above where a non-rotating rail is used, thereby incurring a considerable gain for the rotating masses.

In accordance with another feature of the invention, the flat ring co-operates with braking means of the disk brake type, disposed between the groups of runner wheels in order to prevent the turbine from being driven at too high a speed.

By virtue of another feature of the invention, the rotating hub has a bell-shaped element fitted with the rotor at its larger diameter downstream part, contiguous with the hood, and an upstream part holding the bases of the blades.

In accordance with another feature of the invention, the upstream part of the bell-shaped element is extended by an aerodynamic nose, preferably covering the blade bases.

It should be noted that the hub fitted with its aerodynamic nose and the hood located in the extension thereof are designed to form a streamlined casing forming an integral part of the diffuser unit, thereby helping to optimise the flow of air across the turbine.

In accordance with the invention, the nose of the hub is preferably provided with a wind inlet orifice communicating on the one hand with a water-separating enclosure and on the other with air guide ducts cooling the electric power circuits.

In addition, the hood is preferably extended at its upstream end, contiguous with the rotating hub, by means of a gutter penetrating the interior thereof to collect rain water.

In accordance with another feature of the invention, the blades are helical blades, forwardly inclined at an angle of between 30° and 45° and dimensioned so that the swept diameter is approximately twice or four times that of the hub or hood.

Experience has shown that this design enables maximum power to be obtained.

To render the wind machine proposed by the invention operational, it is naturally vital to equip it in a known manner with orientation members comprising a servomechanism coupled with a wind telltale to orient the turbine in the direction of the wind.

By virtue of another preferred feature of the invention, the blades are shrouded, in the region of their ends, by a relatively short, divergent, circular fairing, mounted concentrically with the hub.

This fairing suppresses the turbulence that causes noise and in particular co-operates with the hub and the turbine blades to create a diffuser unit to obtain optimum air suction conditions and hence drive the rotor in rotation.

In accordance with another feature of the invention, the fairing has a rounded leading edge followed by a thick fairing and a divergent thin trailing edge, preferably assisted by gussets distributed in radial planes.

This design produces dual air suction, namely a first suction in the direction of the wind from the upstream part of the turbine into the interior of the fairing and between the blades and, on the other hand, a second suction created at the downstream part of the turbine from threads of air accelerated on a level with the trailing edge.

The fairing proposed by the invention preferably consists of a hollow beam with a substantially triangular section.

A fairing of this type may be displaced in rotation, borne by the blades, depending on the circumstances.

However, by virtue of another feature of the invention, the latter is preferably a stationary element, mounted on arms joined to the frame and co-operating with the blade ends at a slight clearance.

It may be of advantage to provide an abrasive coating on the face of the fairing directed towards the blades, to deal with accidental contact with the ends of thereof.

Figure 2:
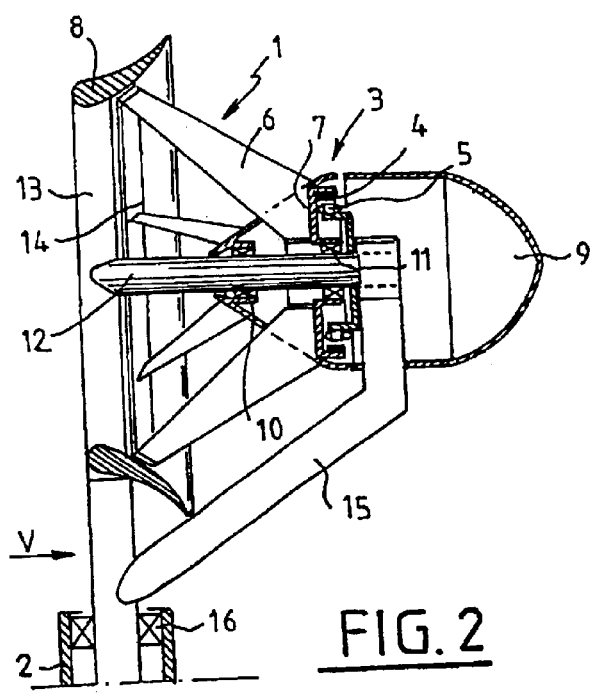
Figure 3:
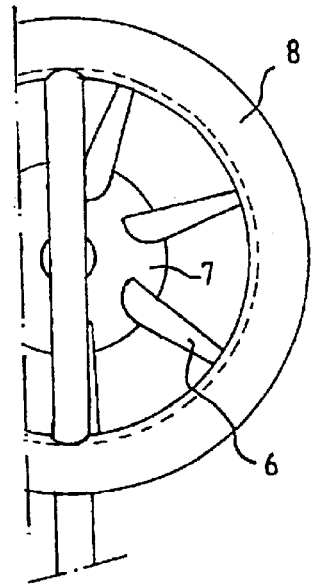
Figure 5:
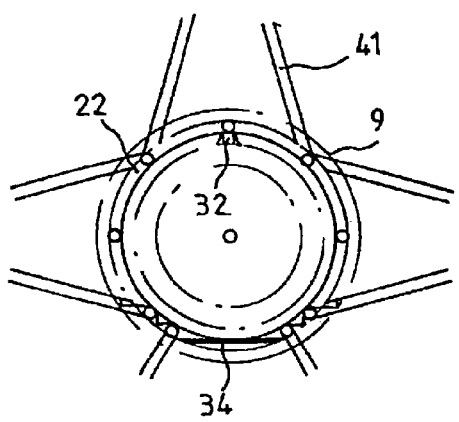
Figure 4:
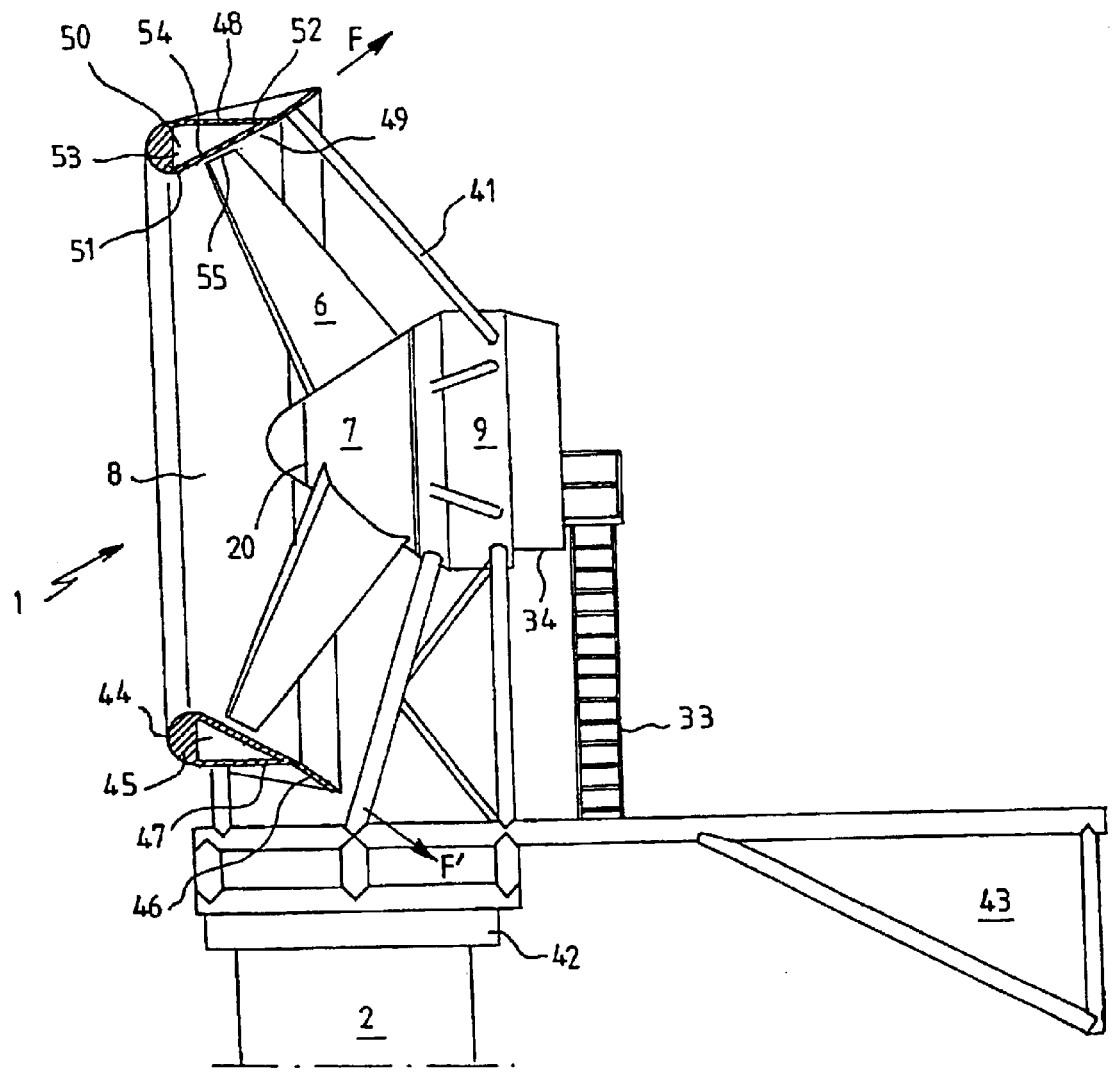
Figure 6:
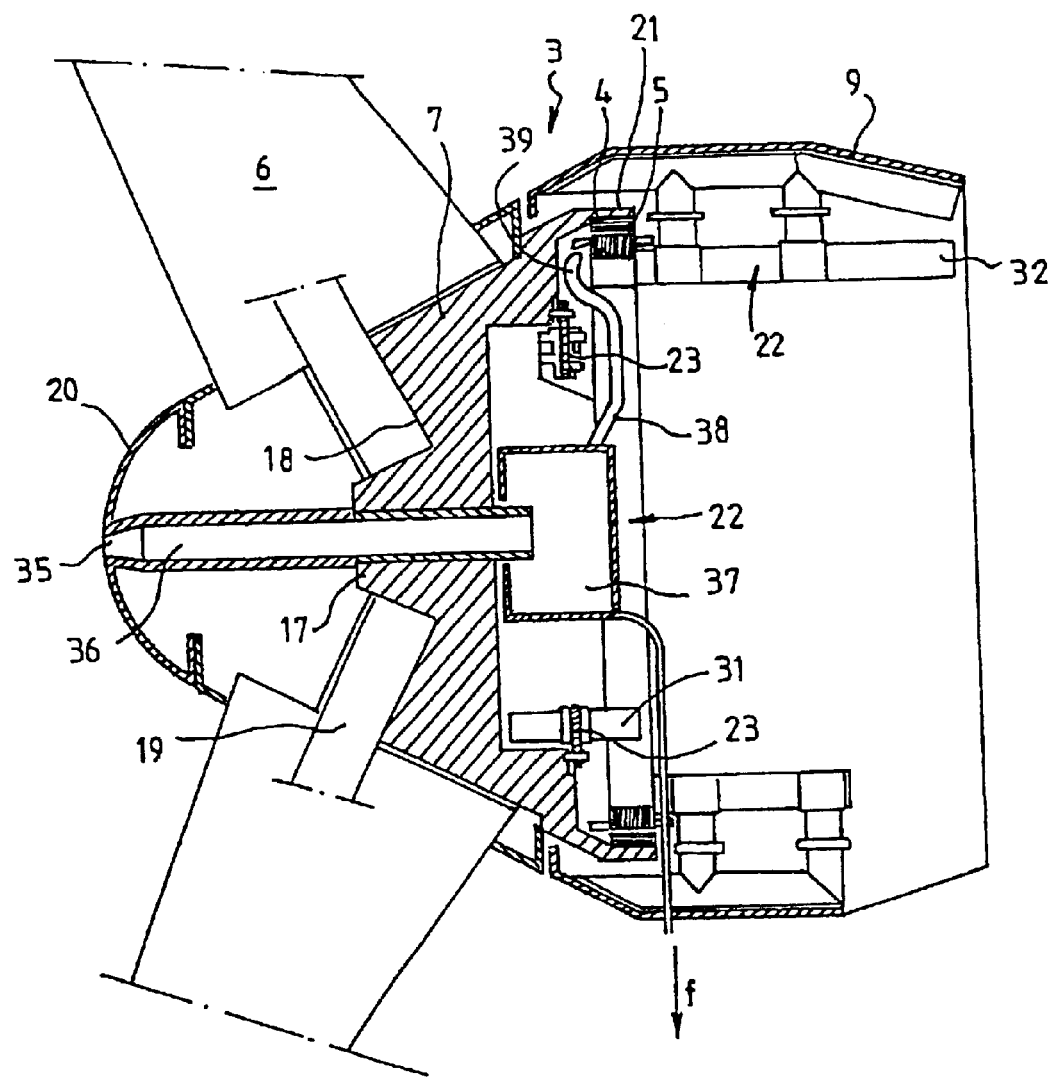
Figure 7:
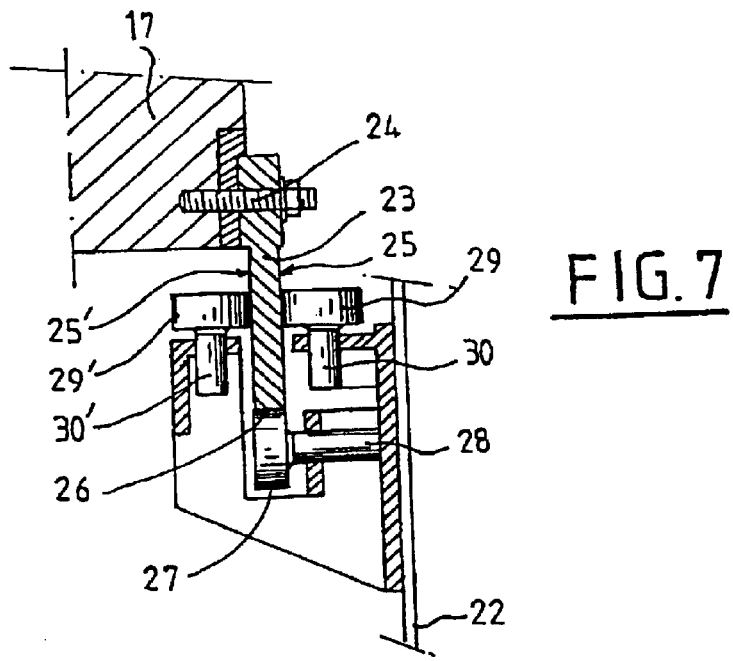
Figure 8:
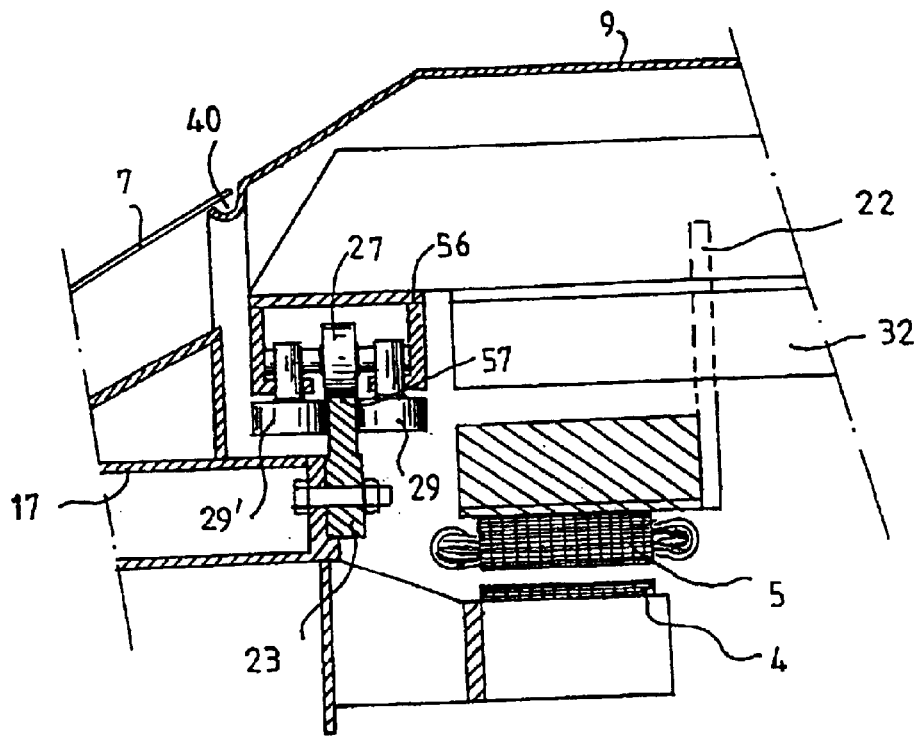

The characterising features of the wind machine proposed by the invention will be described in more detail with reference to the appended drawings, of which:

FIG. 1 is a perspective view of the turbine, with a fairing,

FIG. 2 illustrates a first embodiment of the wind machine, seen in axial section, FIG. 3 is a partial front view of this first embodiment, FIG. 4 is a partial view in axial section of a 20 second, preferred embodiment of the invention, FIG. 5 is a partial view seen from the downstream end of FIG. 4, FIG. 6 is a detailed view in axial section of the wind machine illustrated in FIG. 4, FIG. 7 shows a detail from FIG. 6, illustrating the flat ring and a group of runner wheels, FIG. 8 illustrates a view in section of a variant of the wind machine illustrated in FIGS. 4 to 7.

As schematically illustrated in the drawings, the wind machine has a turbine 1 which is mounted on a mast 2 and co-operates with an alternator comprising a rotor 4 and a stator 5 to generate electricity.

Although not illustrated in the drawings, the rotor 4 is a rotor with permanent magnets regularly distributed in a circle whilst the stator 5 is a stator with magnetic coils, adjacent to the rotor 4, distributed in a partial or full circle.

In addition and as illustrated in the drawings, the turbine 1 is fitted with helical blades 6, inclined towards the upstream end in the direction V of the wind, the generators of which are located along the trunk of a cone.

These blades 6 are borne by a large-diameter hub 7 with a horizontal axis and are surrounded in the vicinity of their ends by a relatively short, divergent, circular fairing 8, which is mounted concentrically with the hub 7.

The rotor 4 is secured to the hub 7 on a level with the maximum available diameter.

The stator 5 is joined to an encircling hood 9, mounted coaxially with and extending the hub 7 to form a streamlined casing.

As illustrated in FIG. 2, the blades 6 are fixed to the hub 7, which rotates about runners 10, 11 borne by a fixed shaft 12. Downstream in the direction V of the wind, the latter is supported by a diametrically profiled bar 13 supporting the fairing 8, which co-operates with the ends of the blades at a slight clearance.

The latter are also joined to one another by a conical ring 14.

In another variant not illustrated in the drawings, the turbine 1 is not fitted with a fairing and the conical ring 14 is slightly larger at the requisite point to create the divergence for the air flow.

Furthermore, as illustrated in FIG. 2, the diametric bar 13 bears an oblique bracket 15 which helps to provide downstream support for the fixed shaft 12 and the stationary hood 9 extending the rotating hub 7.

The resultant unit is mounted so that it can be oriented at the top end of the mast 2 by means of a bearing 16 with a vertical axis so that the wind machine can be positioned facing the wind.

As illustrated in FIG. 6, the hub 7 essentially consists of a bell-shaped element 17 provided with oblique cells 18 retaining the ends of spars 19 inside the blades 6, which are therefore secured on a level with their bases.

The upstream part of this element 17 having a smaller diameter is provided with an aerodynamically shaped conical nose 20 located in the extension thereof and its downstream part having a larger diameter is extended by the stationary encircling hood 9 joined to the stator 5; the unit comprising the hub 7, the aerodynamic nose 20 and the encircling hood 9 thus form a streamlined casing, more clearly illustrated in FIG. 4.

Furthermore, as illustrated in FIGS. 6 and 7, the downstream part of the bell-shaped element 17 is provided with a flared edge 21, defining an annular collar, the internal periphery of which bears the rotor 4.

The stator 5 is in turn secured facing the rotor 4 and inside the latter on a frame 22 of mechanically welded sections; the encircling hood 9 coaxially extending the hub 7 is also secured to the frame 22.

The stationary frame 22 is also joined to other members of the wind machine, such as a bracket 32 for hoisting up construction or maintenance equipment, and the mast 2.

As illustrated in FIG. 4, a ladder 33 facilitates access to the internal part of the hood 9, which has a cut-out at 34 to allow this equipment to be hoisted through.

As illustrated in FIGS. 6 and 7, the internal part of the bell-shaped element 17 is also provided with a flat ring 23 secured thereto by means of bolts 24 (FIG. 7) and defining a retaining and guide rail of the hub 7 during rotation.

This flat ring 23 has two lateral faces 25, 25' and an internal peripheral edge 26 on which groups of runner wheels distributed at various points around its periphery run.

More specifically and as illustrated in FIG. 7, each of the groups of runner wheels has, on the one hand, a runner wheel 27 on a horizontal shaft 28 which runs on the internal peripheral edge 26 of the ring 23 and, on the other hand, two runner wheels 29, 29' with radial shafts 30, 30' which guide the respective lateral faces 25, 25' of the ring 23 retaining a slight clearance in order to keep it in its plane of rotation.

The shafts 28, 30, 30' of the runner wheels 27, 29, 29' are also fixed to the frame 22 supporting the stator 5 and the encircling hood 9.

As illustrated in FIG. 6, the flat ring 23 is also under control of braking means 31 of the disk brake type, disposed between the sets of runner wheels 27, 29, 29'.

FIG. 6 illustrates the aerodynamic nose 20 of the hub 7, which has an air inlet orifice 35 at its axial part, linked via a substantially horizontal duct 36 to a water-separation box 37; water can therefore be discharged downwards in the direction of arrow f. The water-separation box 37 also communicates with cooling ducts 38 which convey fresh air to the electric circuits of the alternator 4, 5 via pipes 39.

As illustrated in more detail in FIG. 8, the wind machine is also provided with a guttering 40, which extends the encircling hood 9 inside the rotating hub 7 in order to collect rain water and discharge it downwards.

As illustrated in FIGS. 4 and 5, the fairing 8 is secured to the fixed frame 22 by means of arms 41 inclined towards the upstream end, which pass through the encircling hood 9.

The turbine 1 configured as explained above is mounted at the top of a mast 2 by means of an orientation bearing, the housing 42 of which is linked to a servomechanism coupled with a wind telltale, not illustrated, mounted downstream on a structure 43 to enable the turbine 1 to be positioned facing the wind.

As illustrated in FIGS. 1 and 4 (which shows a view in section), the fairing 8 co-operates with the ends 55 of the blades 6 at a slight clearance therefrom; it has a rounded leading edge 44 followed by a thick fairing 45 and a divergent, thin trailing edge 46 assisted by gussets 47 distributed in radial planes.

This configuration creates a divergence for the air flow downstream, in the direction of arrows F and F'.

As illustrated in FIG. 4, the fairing 45 is made from a hollow beam with a substantially triangular cross section. More specifically, this beam has a substantially rectilinear external face 48 and a rounded internal face 49.

In addition and in a variant of the embodiment illustrated in FIG. 8, the positions of the rotor 4 and the stator 5 may be reversed so that the rotor 4 is located inside the stator 5.

A design of this type facilitates the operations involved in mounting and dismantling the stator 5, which is made from individually demountable sections which can be manipulated by means of a pulley system, not illustrated, hooked onto the bracket 32.

In this design, the runner wheels 27, 29, 29' of the flat ring 23 are retained by a Beat 56 secured to the frame 22, the wheel 27 with the horizontal shaft being shown slightly to the rear of the section illustrated in the diagram. It runs on the external peripheral edge 57 of the ring 23.

What is claimed is:

1. Wind machine mounted on a vertical mast and having a wind-driven turbine which is fitted with blades mounted on a large-diameter hub with a horizontal axis, and an alternator co-operating with the turbine to generate electrical power and which is provided on the one hand with a magnetic rotor secured to the hub, preferably on a level with the maximum available diameter, and on the other hand a magnetic coil stator adjacent to the rotor and secured to a stationary frame joined to an encircling hood extending the hub coaxially to form a streamlined casing in which the alternator is housed, characterised in that the internal part of the hub is provided with a flat ring having a horizontal axis coinciding with the axis of rotation, the lateral faces and/or the internal or external peripheral edge of which co-operate with groups of runner wheels having fixed shafts joined to the frame to define a retaining and guide rail during rotation.

2. Wind machine as claimed in claim 1, characterised in that the flat ring co-operates with braking means of the disk brake type disposed between the groups of wheels.

3. Wind machine as claimed in claim 2, characterised in that the upstream end of the hood contiguous with the rotating hub is extended by a gutter penetrating the interior thereof for collecting rain water.

4. Wind machine as claimed in claim 1, characterised in that the upstream end of the hood contiguous with the rotating hub is extended by a gutter penetrating the interior thereof for collecting rain water.

5. A wind machine mounted on a vertical mast, said wind machine comprising a stationary frame, a hub rotatably mounted on said frame and having a horizontal axis, a wind-driven turbine including blades mounted on said hub, an alternator operatively connected to said turbine for generating electrical power, said alternator comprising a rotor fixed to said hub on a level with the maximum available hub diameter, a stator coil disposed adjacent the rotor and secured to said stationary frame, a hood secured to said frame and coaxially extending said hub to form a streamlined casing in which the alternator is disposed, said hood having an upstream part and a downstream part, said upstream part including an aerodynamic nose for shrouding the bases of the blades, said downstream part extended by a stationary encircling member which is secured to said frame, said aerodynamic nose including a wind inlet orifice which communicates with a water-separating enclosure and a duct for guiding cooling air to said alternator.

6. Wind machine as claimed in claim 5, including a gutter, said gutter comprising an extension of said stationary member and extending into the interior of said hood to collect rain water.

7. A wind machine mounted on a vertical mast, said wind machine comprising a stationary frame, a hub rotatably mounted on said frame and having a horizontal axis, a wind-driven turbine including blades mounted on said hub, an alternator operatively connected to said turbine for generating electrical power, said alternator comprising a magnetic rotor fixed to said hub on a level with the maximum available hub diameter, a magnetic stator coil disposed adjacent the rotor and secured to said stationary frame, a hood secured to said frame and extending said hub coaxially to form a streamlined casing in which the alternator is disposed, said hood having an upstream part and a downstream part, said upstream part including an aerodynamic nose and shrouding the bases of the blades, said downstream part extended by a stationary encircling member which is secured to said frame, and a gutter comprising an extension of said hood disposed upstream, contiguous with, and inside said hub.

8. A wind machine mounted on a vertical mast, said wind machine comprising a stationary frame, a hub rotatably mounted on said frame and having a horizontal axis, a wind-driven turbine which is fitted with blades mounted on said hub, an alternator operatively connected to said turbine for generating electrical power, said alternator comprising a magnetic rotor fixed to said hub on a level with the maximum available hub diameter, a magnetic stator coil disposed adjacent the rotor and secured to said stationary frame, a hood secured to said frame and extending said hub coaxially to form a streamlined casing in which the alternator is disposed, said hood having an upstream part and a downstream part, said upstream part including an aerodynamic nose and shrouding the bases of said blades, said downstream part extended by a stationary encircling bell-shaped member which is secured to said frame and which is contiguous with said hood, said aerodynamic nose including a wind inlet orifice which communicates with a water-separating enclosure and a duct for guiding cooling air to said alternator.

9. A wind machine mounted on a vertical mast, said wind machine comprising a stationary frame, a hub rotatably mounted on said frame and having a horizontal axis, a wind-driven turbine which is fitted with blades mounted on said hub, an alternator operatively connected to said turbine for generating electrical power, said alternator comprising a magnetic rotor fixed to said hub on a level with the maximum available hub diameter, a magnetic stator coil disposed adjacent the rotor and secured to said stationary frame, a hood secured to said frame and extending said hub coaxially to form a streamlined casing in which the alternator is disposed, said hood having an upstream part and a downstream part, said upstream part including an aerodynamic nose and shrouding the bases of the blades, said downstream part extended by a stationary encircling bell-shaped member which is secured to said frame and which is contiguous with said hood, and a gutter comprising an extension of said hood disposed upstream, contiguous with, and inside said hub.

* * * * *